(12) United States Patent
Weckerling et al.

(10) Patent No.: US 7,810,405 B2
(45) Date of Patent: Oct. 12, 2010

(54) ANGLE DRIVE

(75) Inventors: Thomas Weckerling, Lohmar (DE); Hans-Peter Nett, Adenau (DE); Colin Zaers, Siegburg (DE); Karl-Heinz Hülsebusch, Köln (DE)

(73) Assignee: GKN Driveline International GmbH, Lohmar (DE)

( * ) Notice: Subject to any disclaimer, the term of this patent is extended or adjusted under 35 U.S.C. 154(b) by 1684 days.

(21) Appl. No.: 11/012,661

(22) Filed: Dec. 15, 2004

(65) Prior Publication Data

US 2005/0145126 A1     Jul. 7, 2005

(30) Foreign Application Priority Data

Dec. 22, 2003   (DE) ................... 103 60 363

(51) Int. Cl.
*F16H 1/14*     (2006.01)
(52) U.S. Cl. ............ 74/417; 74/640; 475/236
(58) Field of Classification Search ......... 74/410, 74/412, 416, 417, 420, 665 F, 665 H, 665 M, 74/661, 640; 475/230, 236, 251, 248, 344
See application file for complete search history.

(56) References Cited

U.S. PATENT DOCUMENTS

| 2,235,427 | A |   | 3/1941  | Harris |
|-----------|---|---|---------|--------|
| 3,375,727 | A | * | 4/1968  | Nasvytis et al. ............ 74/417 |
| 3,452,620 | A | * | 7/1969  | Hughson ................. 475/247 |
| 4,226,136 | A |   | 10/1980 | Porter et al. |
| 4,718,516 | A |   | 1/1988  | Ozaki et al. |
| 5,074,831 | A | * | 12/1991 | Parigger ................. 475/226 |
| 5,233,886 | A |   | 8/1993  | Bossler, Jr. |
| 5,239,880 | A |   | 8/1993  | Hawkins et al. |
| 5,488,883 | A | * | 2/1996  | McMillen et al. ....... 74/665 GC |
| 5,556,350 | A |   | 9/1996  | Madsack |
| 5,606,893 | A |   | 3/1997  | Shifflett |
| 5,807,202 | A |   | 9/1998  | Sammataro |
| 6,055,880 | A | * | 5/2000  | Gogovitza ................ 74/349 |
| 6,073,510 | A |   | 6/2000  | Tomaselli |
| 6,260,430 | B1 | * | 7/2001 | Andrei ................... 74/410 |
| 7,191,677 | B2 | * | 3/2007 | Barkdoll .................. 74/396 |

FOREIGN PATENT DOCUMENTS

| DE | 2 029 866    |    | 12/1971 |
| DE | 90 10 311.4  |    | 10/1990 |
| EP | 0 971 155    | A1 | 1/2000  |
| GB | 546630       |    | 7/1942  |
| JP | 51067593     | A  | 6/1976  |
| JP | 08304770     |    | 11/1996 |

OTHER PUBLICATIONS

Basstein, Guus; Entwicklung und Anwendung von Kronenradgetrieben; Antriebstechanik, Bd. 39 (2000), No. 9, pp. 44-51.

* cited by examiner

*Primary Examiner*—Richard W Ridley
*Assistant Examiner*—Matthew A Johnson
(74) *Attorney, Agent, or Firm*—Rader, Fishman & Grauer PLLC

(57) ABSTRACT

An angle drive with two shafts (12, 15) which are drivingly connected to one another and whose axes (A1, A2) intersect one another at an angle, wherein on each of the shafts (12, 15) there is firmly arranged at least one gearwheel (19, 20, 21) and wherein there is provided a hollow gear (17) with an axis of rotation (A3) and wherein the gearwheels (19, 20, 21) engage the hollow gear (17).

1 Claim, 5 Drawing Sheets

ANGLE DRIVE

TECHNICAL FIELD

The invention relates to an angle drive having two shafts which are connected to one another by a drive mechanism and whose axes intersect one another at an angle. The invention also relates to an angle drive having two shafts which are connected to one another by a drive mechanism and whose axes cross one another at a distance from one another.

BACKGROUND OF THE INVENTION

In prior art angle drives, very different types of toothing are used. In general engineering applications, most angle drives are composed of two conical gearwheels with outer helical gearing. Crown gear drives wherein one of the gears carries spur gearing are also being used to an increasing extent in general engineering applications.

In automotive applications, in the axle drives of motor vehicles with a rear wheel drive and in angle drives from the output from the driven front axle to the rear axle of vehicles with transverse front engines, it is common practice to use hypoid gears. Hypoid gear arrangements are characterized by pairs of gearwheels with an axis or hypoid offset such as conical pairs of gearwheels with outer helical gearing whose axes cross one another at a distance from one another.

With respect to noise abatement, production technology and efficiency, the above-described angle drives have already reached a very high level. Nevertheless, such devices have limited torque transmitting capability. Despite the use of helical gears in the form of hypoid drives, pairs of externally toothed gearwheels with limited tooth overlap create a disadvantage in terms of torque transmission.

Thus, there exists a need for an angle drive having improved torque transmitting capacity while retaining comparable gearwheel dimensions.

SUMMARY OF THE INVENTION

The present invention provides an angle drive having an increased torque transmitting capacity while retaining comparable gearwheel dimensions.

A first embodiment provides an angle drive with two shafts which are connected to one another by a drive mechanism and whose axes A1, A2 intersect one another at an angle. On the input shaft and on the output shaft there is firmly arranged at least one gearwheel. A hollow gear with an axis of rotation A3 is also provided. The gearwheels engage the hollow gear. The axis of rotation A3 can be positioned in the plane formed by the axes A1, A2 of the shafts. More particularly, it can be positioned perpendicularly on the angle-bisecting plane W of the angle formed by the axes A1, A2 of the shafts.

A further embodiment provides an angle drive with an input shaft and an output shaft whose axes A1, A2 cross one another in a skewed way. In other words, they are offset or cross one another at a distance. On the input shaft and on the output shaft there is firmly arranged at least one gearwheel, and a hollow gear with an axis of rotation A3 is also provided. The axis of rotation A3 can extend between the intersecting axes A1, A2 perpendicularly relative to the distance line V between the axes A1, A2. More particularly, it can extend perpendicularly relative to an angle-bisecting plane W of a perpendicular projection of the axes A1, A2 of the shafts on a plane E which contains the axis of rotation A3 and extends perpendicularly relative to the distance line V, with the gearwheels engaging the hollow gear.

In further embodiments, the axes of the two shafts intersect at a right angle or cross one another in a skewed way. In one example where the axes intersect one another, one of the shafts preferably comprises two gearwheels. In the case of axes crossing one another, both shafts and the output shaft can each be provided with two gearwheels. As far as the shape of the individual gearwheels can be straight-toothed or conical tooth faces as disclosed with respect to the figures.

The inventive embodiments advantageously combine the positive characteristics of gearwheels with external gearing by providing an adequate degree of overlap of the toothings between a hollow gear and a gearwheel with external toothing. The number of teeth simultaneously engaging one another for carrying purposes is higher than the number of outer teeth engaging one another. By at least one inventive first pair of toothings, the torque is transmitted from an input shaft to the hollow gear and by at least one inventive second pair of toothings it is transmitted from the hollow gear to an output shaft. The hollow gear can, in a suitable way, be supported directly on its ring gear in a housing on the outside. A rolling contact bearing can also be considered. Independently of the shape of the teeth, the axes of the shafts connected to one another in respect of drive and of the axis of rotation of the hollow gear can be arranged in one plane (the axes intersect one another) or also in different planes (the axes cross one another).

Different transmission ratios can be achieved by using differently sized gearwheels on the input shaft and output shaft.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION OF THE DRAWINGS

While the angle drive described herein is advantageous for automotive vehicle applications, it may be adapted and utilized in other applications where high torque capacity in a relatively compact design is desirable. Also, in the following figures, various parameters and components are described for several embodiments. These specific components and arrangement are included as examples and are not meant to be limiting.

Figure 1:
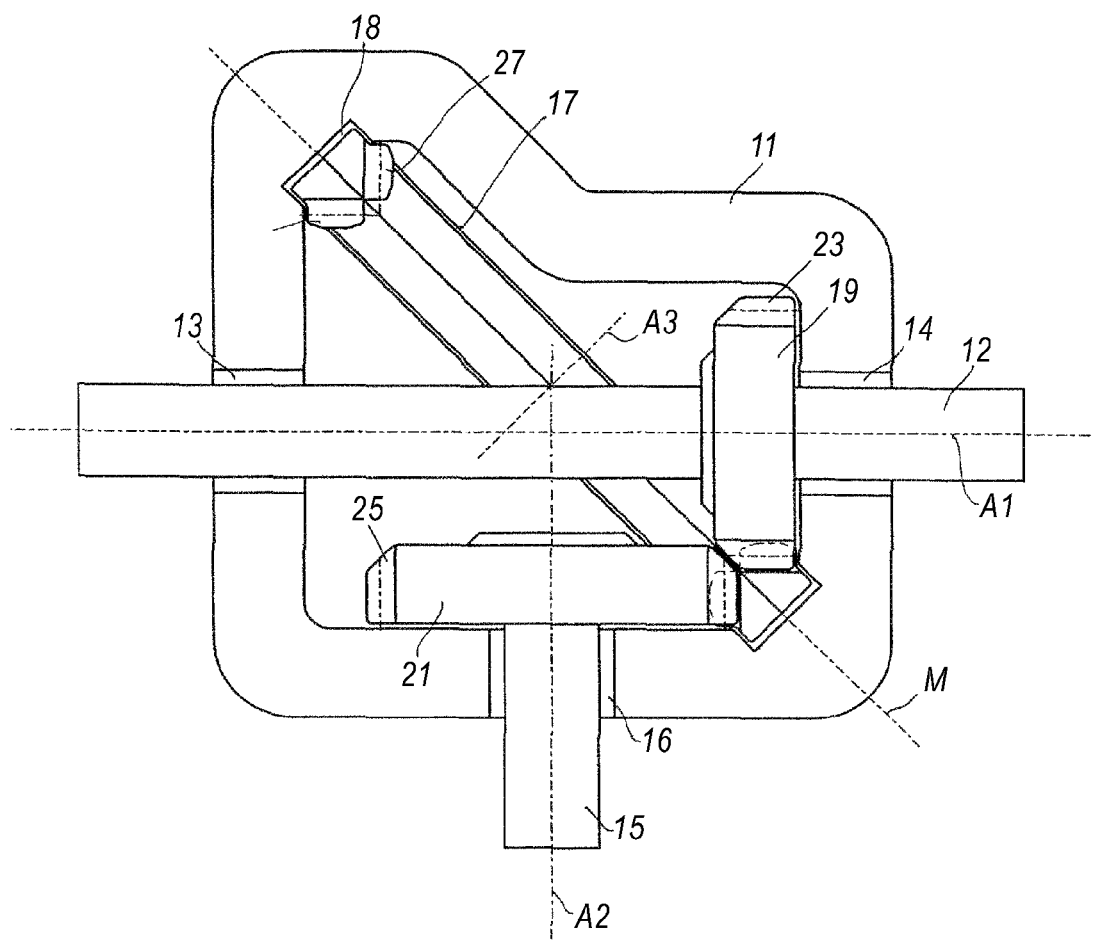
FIG. 1 shows a first embodiment of an angle drive whose axes intersect one another.

Referring now to the drawings wherein like reference numerals are used to identify similar components in the various views, FIG. 1 substantially illustrates of a housing 11 in which an input shaft 12 is rotatably supported in two bearings 13, 14. The axis of the input shaft has been given the reference number A1. Furthermore, in the housing 11, in a bearing 16, there is supported an output shaft 15 whose axis A2 perpendicularly intersects the axis A1 of the input shaft 12. Furthermore, the housing accommodates a hollow gear 17 which, by way of bearings 18, is rotatably supported in the housing 11. The axis of rotation A3 of the hollow gear is positioned in the plane formed by the axes A1 and A2, which is the drawing plane. The axis of rotation A3 of the hollow gear 17 is positioned perpendicularly on an angle-bisecting plane W of the angle enclosed by the axes A1, A2 of the shafts. The axes A1, A2, A3 intersect one another in pairs in three different points of intersection. On the input shaft 12, there is secured a first smaller gearwheel 19 whose teeth engage those of the hollow gear 17. Furthermore, on the output shaft 15, there is secured a larger gearwheel 21 which also engages the hollow gear 17. The hollow gear 17 comprises an assembled doubly internally conical toothing 27. The gearwheels 19, 21 comprise straight teeth 23, 25 which are adapted to said toothing 27 and which engage only one half of the toothing 27 of the hollow gear 17, with reference to the central plane M of the hollow gear. The hollow gear 27 can comprise two individual rings secured together along the central plane M. The gearwheel 19 and the gearwheel 21 each comprise chamfers and are therefore arranged at a distance from one another.

Figure 2:
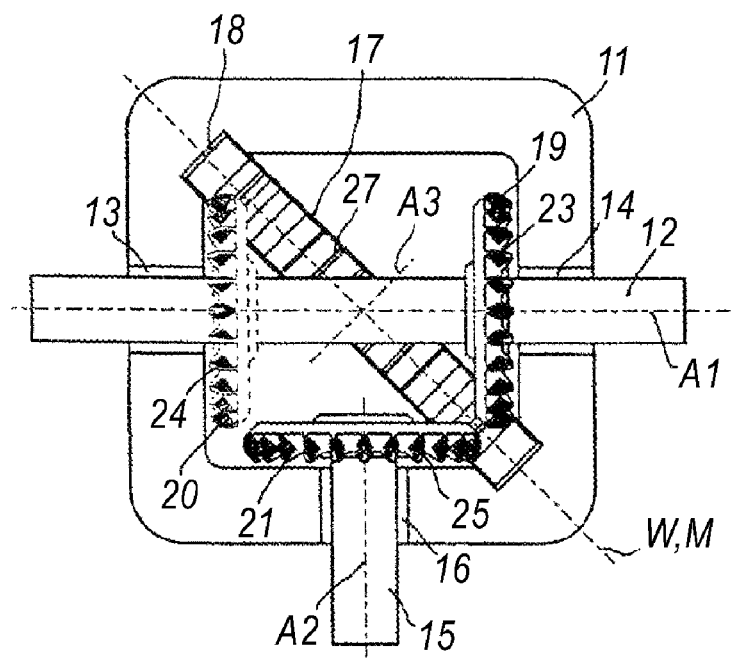
FIG. 2 shows a second embodiment of an angle drive whose axes intersect one another.

FIG. 2 is a schematic illustration of a housing 11 in which an input shaft 12 is rotatably supported in two bearings 13, 14. The axis of the input shaft has been given the reference number A1. Furthermore, in the housing 11, in a bearing 16, there is supported an output shaft 15 whose axis A2 perpendicularly intersects the axis A1 of the input shaft 12. Furthermore, the housing accommodates a hollow gear 17 which, by way of a bearing 18, is rotatably supported in the housing 11. The axis of rotation A3 of the hollow gear is positioned in the plane formed by the axes A1 and A2, which is the drawing plane. Furthermore, the axis of rotation A3 is positioned perpendicularly on the angle-bisecting plane W of the angle formed by the axes A1 and A2. On the input shaft 12, there is secured a first gearwheel 19 whose teeth engage those of the hollow gear 17. Furthermore, on the input shaft 12, there can be secured a second gearwheel 20 which is illustrated by dashed lines and which can also engage the hollow gear 17 in a position which is radially opposed to the first gearwheel 19 engaging position. Furthermore, a third gearwheel 21 which also engages the hollow gear 17 is secured on the output shaft 15. The hollow gear 17 comprises straight teeth 27, and the gearwheels 19, 20, 21 comprise teeth 23, 24, 25 which are adapted to the straight teeth 27 and which engage only one half of the teeth 27 of the hollow gear 17 with reference to the central plane M of the hollow gear 17, which central plane M corresponds to the above-mentioned angle-bisecting plane W. The gearwheel 19 and the gearwheel 21 are arranged at a distance from one another.

In operation, to distribute power, one of the ends of the input shaft 12 can serve as the input and the opposed end of the input shaft 12 as an output, whereas the output shaft 15 serves as an output only.

Figure 3:
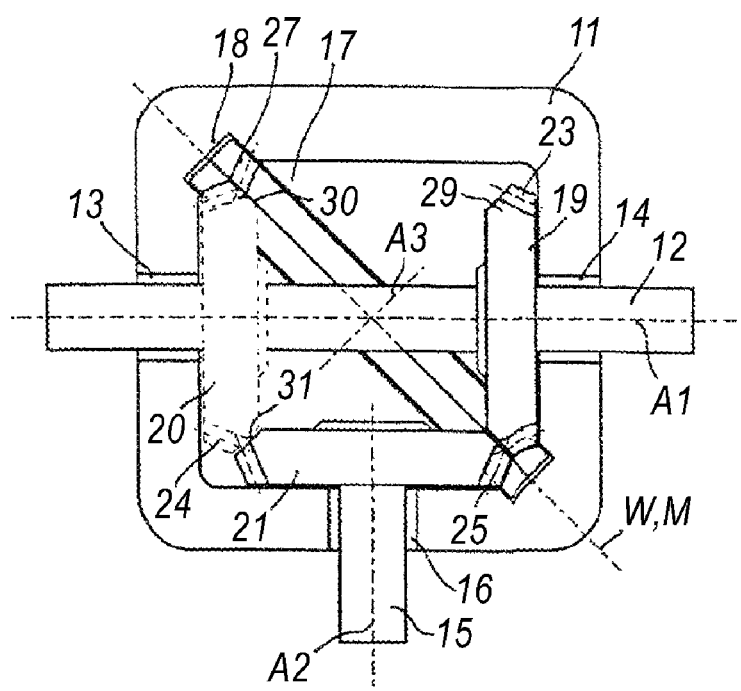
FIG. 3 shows a third embodiment of angle drive whose axes intersect one another.

In FIG. 3, any details identical to those shown in FIG. 2 have been given the same reference numbers. To that extent, reference is made to the description of FIG. 2. The hollow gear 17, like the embodiment according to FIG. 1, comprises doubly internally conical teeth 27, as a result of which the teeth of the gearwheels 19, 20, 21 feature a cone angle. The first and third gearwheels 19, 21 comprise conical faces 29, 31 which form a gap. The second gearwheel 20 comprises a conical face 30 which forms a gap together with the face 31.

Figure 4:
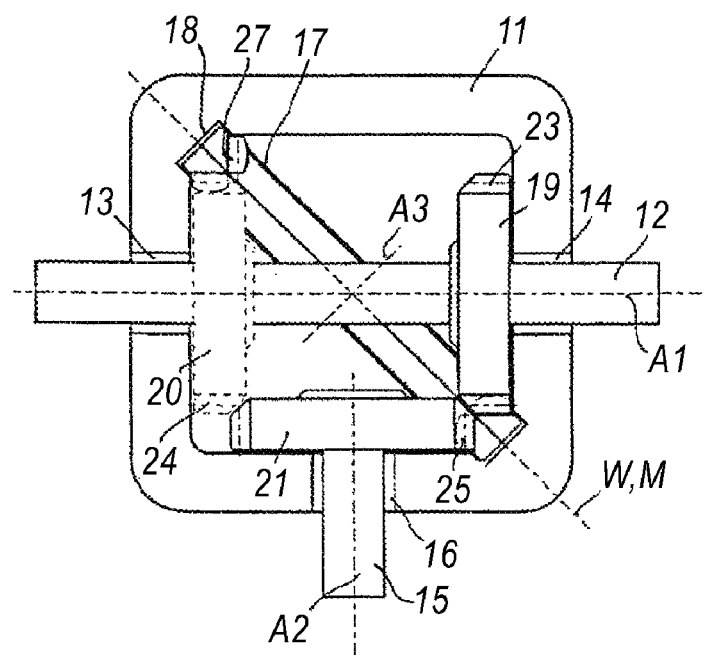
FIG. 4 shows a fourth embodiment of an angle drive whose axes intersect one another.

In FIG. 4, any details identical to those shown in FIGS. 1 and 2 have been given the same reference numbers. To that extent, reference is made to the description of same. In this example, however, the teeth 22 of the hollow gear 17 correspond to those shown in FIG. 1, so that the teeth 23, 24, 25 of the first, second, and third gearwheels 19, 20, 21 are configured as straight teeth.

Figure 5:
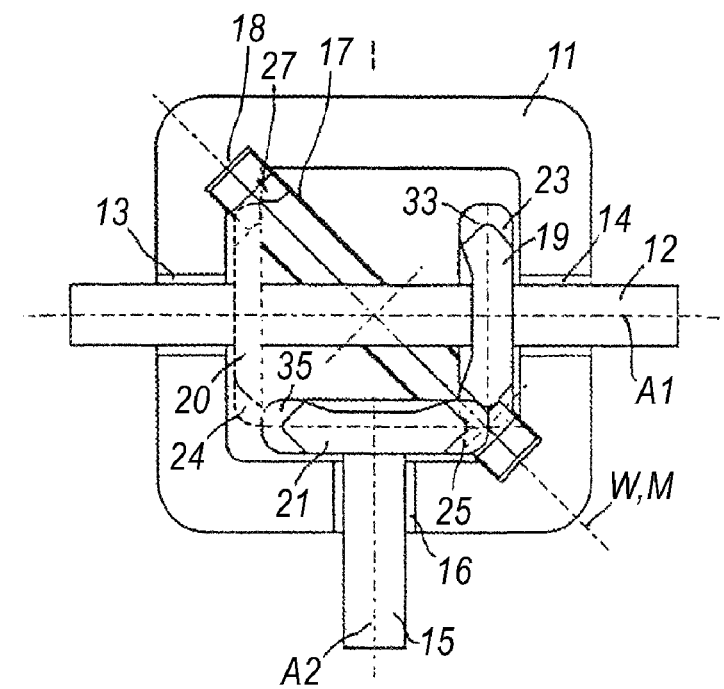
FIG. 5 shows a fifth embodiment of an angle drive whose axes intersect one another.

In FIG. 5, any details identical to those shown in the preceding Figures have been given the same reference numbers. To that extent, reference is made to the description of same. As in FIG. 2, the hollow gear 17 is again provided with straight teeth 27, but the first and third gearwheels 19, 21, in deviating from FIG. 2, are not provided with conical faces, but with additional teeth 33, 35 which are additionally directly engaged by the gearwheels 19, 21. That is, the first gearwheel 19 and third gearwheel 21 each have toothed halves 33, 35 and are outwardly toothed in a roof-shaped way. These gearwheels 19, 21 each engage each other directly by the toothed halves 33, 35 and engage the hollow gear 17 with the other one of their toothed halves 23, 25. The second gearwheel 20 cannot comprise such additional teeth because it rotates against the direction of rotation of the gearwheel 21.

Figure 6A:
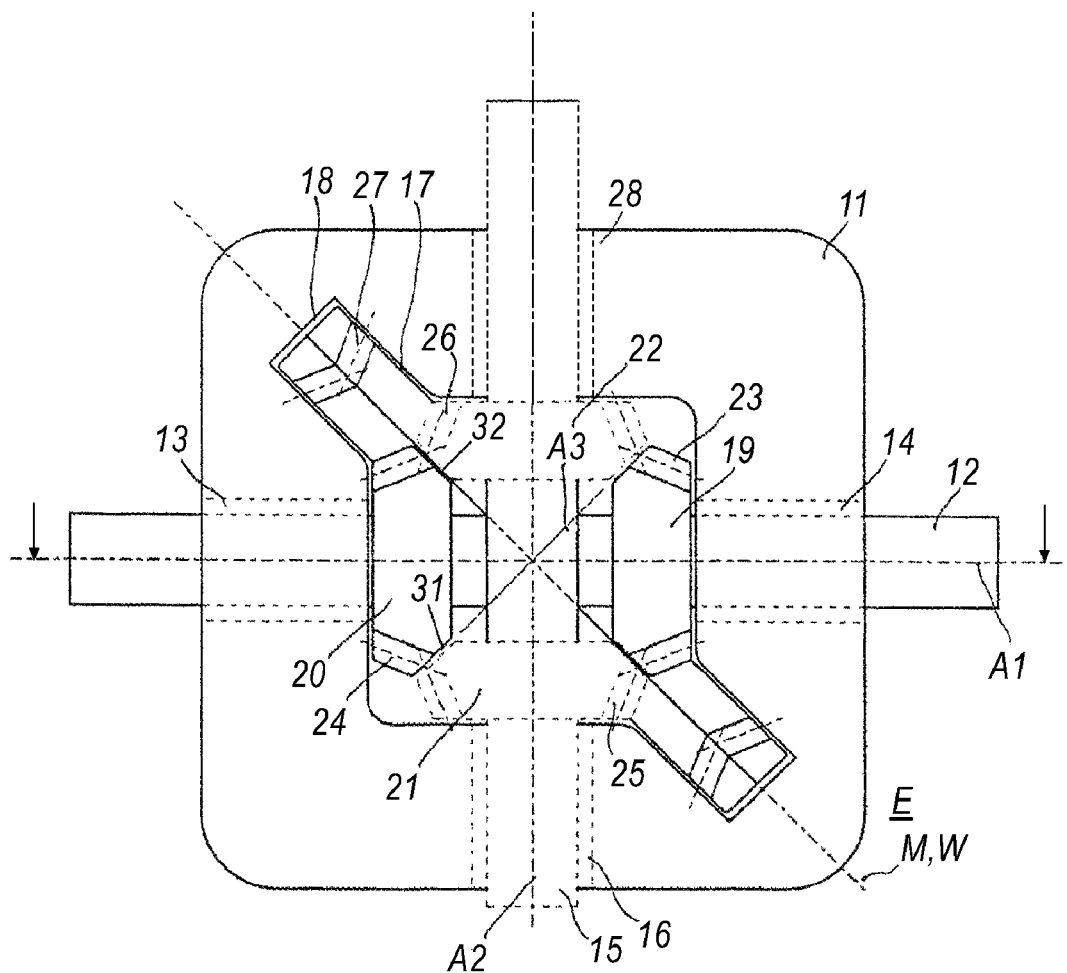
FIG. 6A shows a first illustration of an angle drive whose axes cross one another at a distance from one another.
Figure 6B:
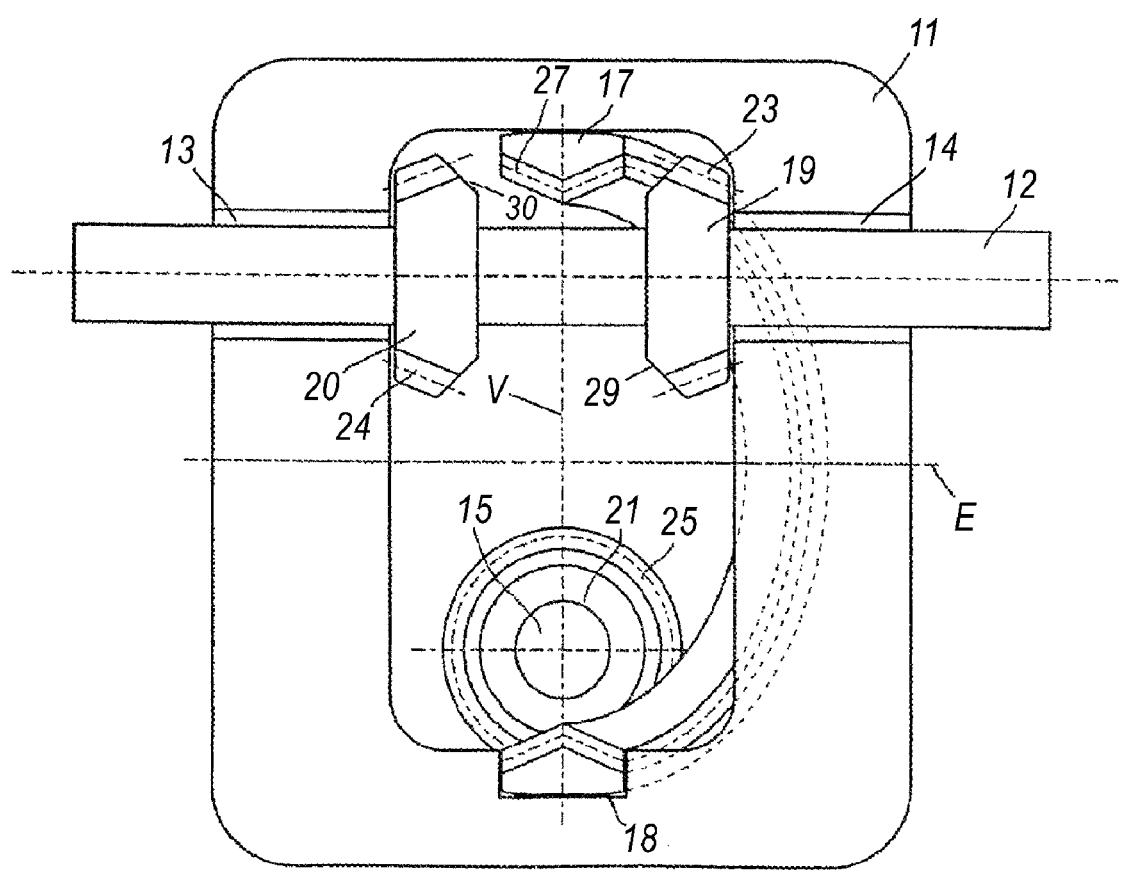
FIG. 6B shows a second illustration of an angle drive according to FIG. 6A.

FIGS. 6A and 6B will be described jointly. An input shaft 12 with an axis A1 and an output shaft 15 with an axis A2 are supported in a housing 11, with the axes A1, A2 crossing one another at right angles. The distance line V positioned perpendicularly on the two axes A1, A2 is also shown. The input shaft 12 comprises two gearwheels 19, 20 and the output shaft 15 two gearwheels 21, 22. Said gearwheels comprise teeth 23, 24, 25, 26 and rear conical faces 29, 30, 31, 32. The sectional plane E positioned perpendicularly on the distance line V contains the axis of rotation A3 of the hollow gear 17 whose teeth 27 substantially correspond to those shown in FIG. 2. The axis of rotation A3 is positioned perpendicularly on the angle-bisecting plane W of the angle formed by the axes A1, A2 projected on to the plane E. The plane E corresponds to the drawing plane of FIG. 6A). As is particularly noticeable in FIG. 6A, the gearwheels 19, 20, 21, 22 do not engage the radially opposed regions of the hollow gear 17, but relatively closely adjoining regions in two different planes. With reference to FIG. 6B, the first and third gearwheels 19, 20 of the input shaft 12 are positioned underneath the plane E and the second and fourth gearwheels 21, 22 of the output shaft 15 above the plane E. In this way, the first and third gearwheels 19, 20 are offset from the second and fourth gearwheels 21, 22. Because the two shafts 12, 15 are each provided with gearwheels 19, 20; 21, 22, these are, in an advantageous way, free of axial forces even when they are under torque, because the tooth forces are eliminated symmetrically.

While the invention has been described in connection with several embodiments, it should be understood that the invention is not limited to those embodiments. For example, the first gearwheel 19 and third gearwheel 21 can have different diameters. Thus, the invention covers all alternatives, modifications, and equivalents as may be included in the spirit and scope of the appended claims.

What is claimed is:

1. An angle drive comprising an input shaft and an output shaft which are drivingly connected to one another and whose axes intersect one another at an angle, at least one gearwheel fixed on said output shaft and two gearwheels arranged on said input shaft, and a hollow gear with an axis of rotation, said hollow gear having at least one inner toothing, and wherein one gearwheel on the input shaft and one gearwheel on the output shaft each have a first toothing and a second toothing, forming two toothing halves, wherein said one gearwheel on the input shaft and said one gearwheel on the output shaft engage one another directly by way of their first toothings and, by way of their second toothings, engage the hollow gear.

* * * * *